Sept. 16, 1969  J. KIRK ET AL  3,466,762
TECHNICAL EDUCATIONAL DEVICE
Filed Dec. 14, 1966  2 Sheets-Sheet 1
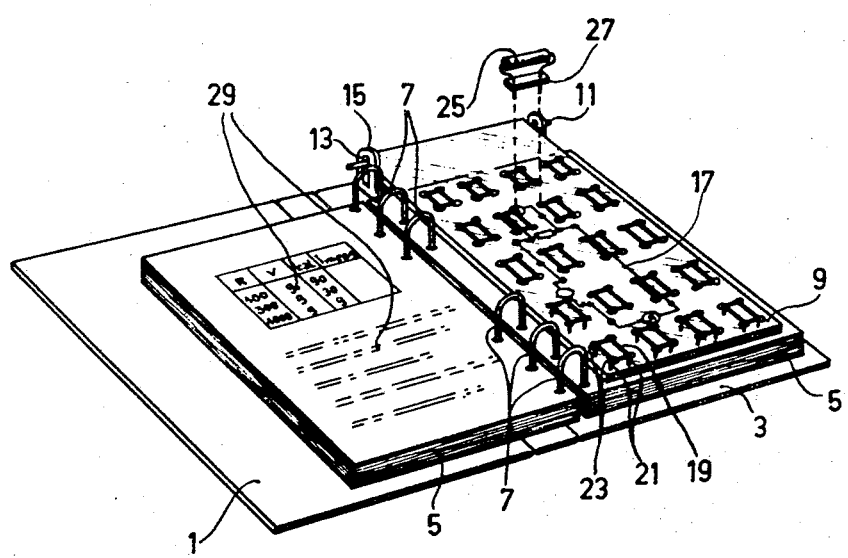
FIG. I
INVENTORS
JOZEPH KIRK
ROBERT F.K. FORSTHUBER
BY
AGENT Sept. 16, 1969 J. KIRK ET AL 3,466,762
TECHNICAL EDUCATIONAL DEVICE
Filed Dec. 14, 1966 2 Sheets-Sheet 2

INVENTORS
JOZEPH KIRK
ROBERT F. K. FORSTHUBER
BY
AGENT 3,466,762
TECHNICAL EDUCATIONAL DEVICE
Joseph Kirk and Robert Franz Karl Forsthuber, Emmasingel, Eindhoven, Netherlands, assignors, by mesne assignments, to U.S. Philips Corporation, New York, N.Y., a corporation of Delaware
Filed Dec. 14, 1966, Ser. No. 601,605
Claims priority, application Netherlands, Jan. 22, 1966, 6600859
Int. Cl. G09b 23/06, 25/00, 29/00
U.S. Cl. 35—19                                    4 Claims

ABSTRACT OF THE DISCLOSURE

The device disclosed is a book-like apparatus which assists the teaching of students in the assembly of electric circuitry, optical systems or mechanical devices from schematic diagrams. The apparatus comprises a book cover, a binder mechanism, printed sheets containing schematic diagrams and text material, and a movable transparent plate attached to the book cover for overlying the schematic diagrams. The transparent plate has attached to it a multiplicity of conductor elements or holders which are adapted to receive electrical, optical or mechanical elements in conformance with the pattern and instruction of the schematic diagram underneath the transparent plate.

---

The invention relates to a technical educational appliance comprising at least one transparent plate, on one side of which means are provided for fastening and/or connecting electrical, mechanical or optical parts, and a number of schematic or circuit diagrams to be imitated, any one of which sheets can be placed on the other side of the transparent plate so that it can be seen across the plate.

The prior art devices of this type incorporate circuit diagrams and information data which are drawn on individual sheets. These sheets are placed under a transparent plate. The disadvantage of such devices are that the loose sheets readily get out of order, that the sheets become misaligned with the transparent plate and it is difficult and cumbersome to utilize the device when the circuit diagrams are incorporated on a series of loose sheets. This invention eliminates the above disadvantages since the sheets containing the information are arranged in a book cover which has means for holding the sheets in sequential relationship and means for holding the transparent plate in an aligned relationship with the sheets.

In a particular embodiment of the invention the plate can be tilted around a shaft which is also displaceable in the direction of thickness of the book so as to hold the plate down on one of the halves of the opened book.

Figure 2A:
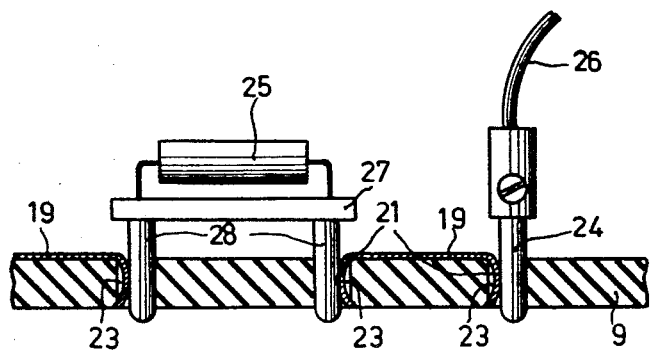
Figure 2B:
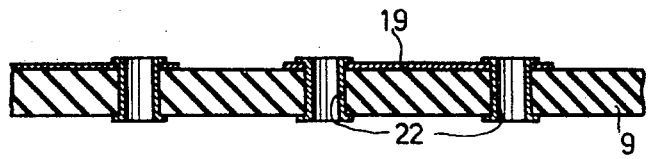

The invention will be described more fully with reference to the accompanying drawings, in which: FIGURE 1 shows a perspective view of the device; FIGURES 2a and 2b are partial sectionad views of embodiments of the transparent plate and the related component receiving elements.

Referring to the drawing, the educational device shown has a cover with foldable cover sections 1 and 3, a binder mechanism 7 and a rotatable transparent plate 9. The binder mechanism 7 is of conventional type thereby permitting the insertion and removal of printed sheets 5. The sheets of pages 5 are rotatable on the binder mechanism 7 and can therefore be stacked on either side of the binder in overlying relationship with the cover sections 1 and 3. This stacking on alternate sides permits the location of the transparent plate 9 on either of the cover sections 1 and 3. In the embodiment of the FIGURE the transparent plate 9 is attached to cover section 3 by means of a shaft 11 and a bracket 15. The shaft 11 extends along the upper edge of the plate 9. Bracket 15 is a U-shaped element, the laterally disposed base of which is fastened to the upper edge of the cover section 3. The upright sections of the bracket 15 are spaced laterally from the plate 9. These sections contain vertical slots 13. The ends of the shaft 11 on plate 9 are inserted into the slots 13 thereby permitting the rotational movement of plate 9 around the axis defined by the shaft 11, and also permitting translational movement towards or away from the cover section 3 which compensates for the thickness of the stacked pages 5. Any combination of rotational or translational movement is provided with this arrangement.

The exposed faces of sheet 5 on the cover section 3 shows a schematic diagram, for example an electric circuit 17 which can be viewed through the transparent plate 9. This circuit is to be duplicated mechanically by a student. In order to facilitate this operation, the upper side of the plate 9 is provided with means for fastening and/or connecting electrical parts. Rectangular metal frames 19 are fastened to the surface of the plate 9, for example, by adhesive bonding. Downwardly bent-over tags 21 near the corners of frames 19 are inserted into corresponding bores 23 of the plate 9. Bores 23 are adapted to receive plugs 24 provided with cords 26 for the connection of electrical apparatus, at the most four plugs can be interconnected by conductive frames 19 and the tags 21. Furthermore, it is possible to affix to the plate 9 insulating plates 27 which are provided with component parts 25 and spaced plug pins 28. The plug pins fit into bores 23 and are engaged by tags 21. Instead of tags 21 conductive flange bushes 22 may be used as shown in FIG. 2b.

It is important that the transparent plate 9 should be aligned with the underlying sheet 5, such that the diagram 17 distinctly indicates the connections to be established between the various conductive rectangules 19. In the device shown, the shaft 11 is positioned with only a small amount of clearance in the slots 13 and the ears 15 are laterally disposed with only a small space on either side of the plate 9. This positioning provides a sufficiently accurate setting of the plate in relation to the sheets 5 which are already fixed by the binder mechanism 7 to the cover section 3.

When the book is open the text 29 associated with a given diagram 17 is found on the left-hand page and hence directly adjacent the diagram and thereby facilitates the construction of the circuitry. This relationship between the text material and circuit diagram continues throughout the sheets 5, that is, on the front of a sheet a circuit diagram appears and on the back of the sheet text material relating to the following circuit diagram appears.

The use of a book of separate, fixable sheets has the advantage that a book with an individual program for each pupil can easily be composed.

The rotatable plate 9 facilitates turning of the sheets 5 and finding the desired sheet. More economical solutions can be found in which the plate 9 is not rotatable but can only be removed from the right hand stack 5. That is, the plate 9 must be slightly larger than the sheets 5 and supported in fixed overlying relation with respect to the sheets by four columnal supports located at the corner of plate 9 and extending perpendicularly to the cover plate 3. A further alternative consists of a plate 9 which is fixed above the cover plate 3 by means of four supports at a height corresponding with the maximum height of the right hand stack 5. The sheets 5 together with the binder mechanism 7 are displaceable and could therefore be removed from below the plate 9. When located below the plate the sheets engage stops determining the correct position with respect to the plate.

The plate 9 may furthermore be provided with means for fixing mechanical or optical parts. In the latter case, for example, a lens system with the associated path of the rays may be recorded on the underlying sheet 5.

For constructing very elaborate circuit diagrams use may be made of two transparent plates 9, each of which can be tilted down on one of the halves of the opened book. In contrast to the drawing, this tilting movement may also be performed about axes extending parallel to the folding line of the cover sections 1 and 3.

We claim:

1. An educational device for use with discrete electrical components which comprises a substantially flat base, a plurality of aligned pages rotatably mounted on said base, schematic diagrams of electrical circuit components in predetermined areas on one side of each said pages explanatory text corresponding to each of said diagrams on sides of said pages confronting said diagrams, a transparent plate having a plurality of holes for receiving said electrical components, an electrical conductor in each of said holes for electrically contacting said components, means on said plate for electrically connecting groups of said conductors, and means for rotatably mounting said plate on said base selectively in a first position spaced from the rotational path of said pages and in a second position substantially contacting one of said pages whereby said holes register with said predetermined areas of a diagram on said page when said plate is in said second position.

2. An educational device as claimed in claim 1 wherein said plate mounting means comprises at least two U-shaped brackets mounted on said base and a pin mounted on said plate and positioned within said brackets for rotational and translational motion.

3. An educational device as claimed in claim 2 wherein said pin of said plate mounting means is positioned perpendicular to the rotational direction of said pages.

4. An educational device comprising a book cover, a plurality of schematic diagrams, binder mechanism means attached to said book cover means for detachably receiving said schematic diagrams, a transparent plate, a pair of opposed U-shaped brackets defining a pair of slots aligned in a plane substantially perpendicular to said book cover and adjacent said diagrams, shaft means attached to an edge of said plate and received in the slots of said brackets thereby permitting translational and rotational movement of said plate with respect to said book cover, whereby said plate may be arranged in overlaying relation with said schematic diagrams, and means on said transparent plate for receiving component parts in alignment with a corresponding diagrammatic element on said schematic diagram.

References Cited

UNITED STATES PATENTS

| | | | |
|---|---|---|---|
| 2,155,924 | 4/1939 | Barrett et al. | 35—53 |
| 2,507,927 | 5/1950 | Olsen-Tank | 282—8 X |
| 2,592,552 | 4/1952 | De Florez | 35—19 |
| 3,145,483 | 8/1964 | Cruz | 35—19 |

FOREIGN PATENTS

| | | |
|---|---|---|
| 123,651 | 7/1931 | Austria. |
| 916,838 | 1/1963 | Great Britain. |

EUGENE R. CAPOZIO, Primary Examiner

H. S. SKOGQUIST, Assistant Examiner

U.S. Cl. X.R.

35—53; 281—38